United States Patent [19]

Deuschle et al.

[11] 4,407,672

[45] Oct. 4, 1983

[54] METHOD FOR THE RECOVERY OF IRON UNITS FROM FLUE DUST GENERATED IN A STEEL MAKING PROCESS

[75] Inventors: Roger A. Deuschle, Villanova; Charles P. Mueller, King of Prussia, both of Pa.

[73] Assignee: International Mill Service, Inc., Philadelphia, Pa.

[21] Appl. No.: 276,977

[22] Filed: Jun. 24, 1981

[51] Int. Cl.³ .......................... C21C 5/52; C21B 3/04; C22B 1/248
[52] U.S. Cl. ...................................... 75/10 R; 75/11; 75/25; 75/44 S
[58] Field of Search ..................................... 75/10-12, 75/25, 3, 44 S

[56] References Cited

U.S. PATENT DOCUMENTS

| Re. 30,060 | 7/1979 | Kreiger | 75/3 |
|---|---|---|---|
| 917,532 | 4/1873 | Minnick | 75/30 |
| 2,173,535 | 9/1939 | Francis | 75/25 |
| 2,373,244 | 4/1945 | Halz | 75/25 |
| 3,169,054 | 2/1965 | Werner | 75/3 |
| 3,276,859 | 10/1966 | Collin | 75/11 |
| 3,645,719 | 2/1972 | Minnic | 75/94 |
| 3,726,665 | 4/1973 | Minnic | 75/30 |
| 3,948,644 | 4/1976 | Maurice | 75/25 |
| 4,003,736 | 1/1977 | Kreiger | 75/3 |

OTHER PUBLICATIONS

Fosnacht, "Recycling of Ferrous Steel Plant Fines, State-of-the-Art," I & SM, pp. 22-26 (Apr. 1981).
"Simplified Processes Bring Recycling of Steel-Furnace Dust Closer to Reality", 33 Magazine, 33-37, Apr. 1976.
"Electric Furnace Steelmaking Dusts-A Zinc Raw Material", U.S. Department of the Interior, RI 8209, Bureau of Mines Report of Investigations/1977, by Higley and Fine.
"Converting Stainless Steel Furnace Flue Dusts and Wastes to a Recyclable Alloy", U.S. Department of the Interior, RI 8039, Bureau of Mines Report of Investigations/1975, by Powell, Dressel and Crosby.
"Development and Application of the Green Pelletizing Process to Produce Agglomerates for BOF and Open Hearth Use", by Weidner and Kreiger, Mining & Processing Section, Research Department, Bethlehem Steel Corporation, Bethlehem, PA, pp. 72-76.

Primary Examiner—Peter D. Rosenberg
Attorney, Agent, or Firm—Dann, Dorfman, Herrell and Skillman

[57] ABSTRACT

A method for the recovery of iron units contained in flue dust generated in a steel making process is provided comprising the steps of collecting the dust generated in the steel making process and agglomerating the collected dust into stable green ball pellets in a pelletizing apparatus. The green ball pellets are loaded into an electric arc furnace charging bucket by placing the pellets at or near the bottom of the charging bucket and covering the pellets with other steel making material. The charging bucket containing the pellets and other steel making material is charged into the electric arc furnace only after the furnace has been previously charged with steel making material which does not contain such pellets.

9 Claims, 2 Drawing Figures

METHOD FOR THE RECOVERY OF IRON UNITS FROM FLUE DUST GENERATED IN A STEEL MAKING PROCESS

BACKGROUND OF THE INVENTION

The present invention relates generally to steel production and, more particularly, to a method for the recovery of iron units from flue dust generated in a steel making process.

In the production of steel in an electric arc furnace or any other type of steel making furnace, a considerable amount of iron-bearing dust or fume is generated. A generally accepted method of capturing the fume or dust to meet environmental obligations is through a dry collection system, whereby the very fine dust is separated from the effluent air in a pollution control apparatus, such as a baghouse filtration system. The disposal of the collected dust presents an ever increasing problem and it has become mandatory to find suitable environmentally accepted methods of dust disposal. However, the collected dust must be put in a form that will show no signs of degradation over a period of time, to prevent any adverse reaction with the environment and to avoid contamination of the surrounding air, water or soil.

There currently exist a wide variety of proposed solutions to the disposal problem, but none of these proposals have proven to be acceptable to the steel making industry. One approach proposed re-utilization of the iron or Fe units contained in the collected dust and suggested placing the collected dust into a stable form which can be recycled back into the furnace for recovery of the Fe units. This approach specifically involved the preparation of stable, green pellets from the collected dust, the handling of the pellets and the charging of the pellets into the furnacing operation.

Processes and methods for making such green ball pellets from the dust or fume generated in the steel making process are generally well known in the art and one such method is described in U.S. Pat. No. 4,003,736, issued Jan. 18, 1977, to Kreiger et al. and entitled "Method for Preparing Dry-Collected Fume for Use in Metallurgical Furnaces", which is incorporated herein by reference. In addition, numerous articles have been published on the subject of making such green ball pellets. Although the prior patents and publications detail the methods and processes for the preparation of the green ball pellets, the known prior art is devoid of any specific teaching concerning how to successfully recycle or reuse the green ball pellets into a furnace for the recovery of the iron units contained therein.

Various prior art methods have suggested charging the green ball pellets into a basic oxygen furnace or an open hearth furnace. Primarily, these methods involve merely dumping the pellets into the furnace. Although dumping the green ball pellets directly into an open hearth or basic oxygen furnace is an inexpensive and convenient way to dispose of the green ball pellets, it has been found that the recovery of the Fe units by this method has not accomplished the desired result and this method of recycling merely increased the amount of fume or dust generated in the steel making process. In addition, the "dumping" methods employed in connection with the basic oxygen furnace and open hearth furnace are not susceptible to successful utilization in connection with an electric arc furnace.

The present invention overcomes the deficiencies of the prior art methods for recycling the flue dust generated in a steel making process and for recovering the iron units contained in the dust by providing an improved method for the handling and placement of the green ball pellets in the furnace charge of an electric arc furnace. By employing the method of the present invention the problem of disposing of the collected flue dust is solved and, in addition, valuable steel making material is recovered from the collected dust and added to the furnace melt, thereby adding of the economy of the steel making process.

SUMMARY OF THE INVENTION

The present invention provides a method for the recovery of iron units collected in flue dust generated in a steel making process. The method comprises the steps of collecting the dust generated in a steel making process and agglomerating the collected dust into green ball pellets in a pelletizing apparatus. The green ball pellets are then loaded into an electric arc furnace charging bucket by placing the pellets at or near the bottom of the charging bucket and by covering the pellets with other steel making material. The electric arc furnace is charged with the pellets and other material in the charging bucket only after the furnace has been previously charged with steel making material which does not contain any pellets.

In the preferred practice of the method, a layer of lightweight steel making scrap material is placed in the bottom of the charging bucket prior to loading the pellets into the charging bucket, then the pellets in the charging bucket are covered with a first layer of lightweight steel making scrap material and the layer of lightweight steel making scrap material is covered by a layer of medium to heavyweight steel making scrap material.

BRIEF DESCRIPTION OF THE DRAWINGS

The foregoing summary as well as the following detailed description of a preferred embodiment of the present invention will be better understood when read in conjunction with the accompanying drawing, in which.

DESCRIPTION OF THE PREFERRED EMBODIMENT

Figure 1:
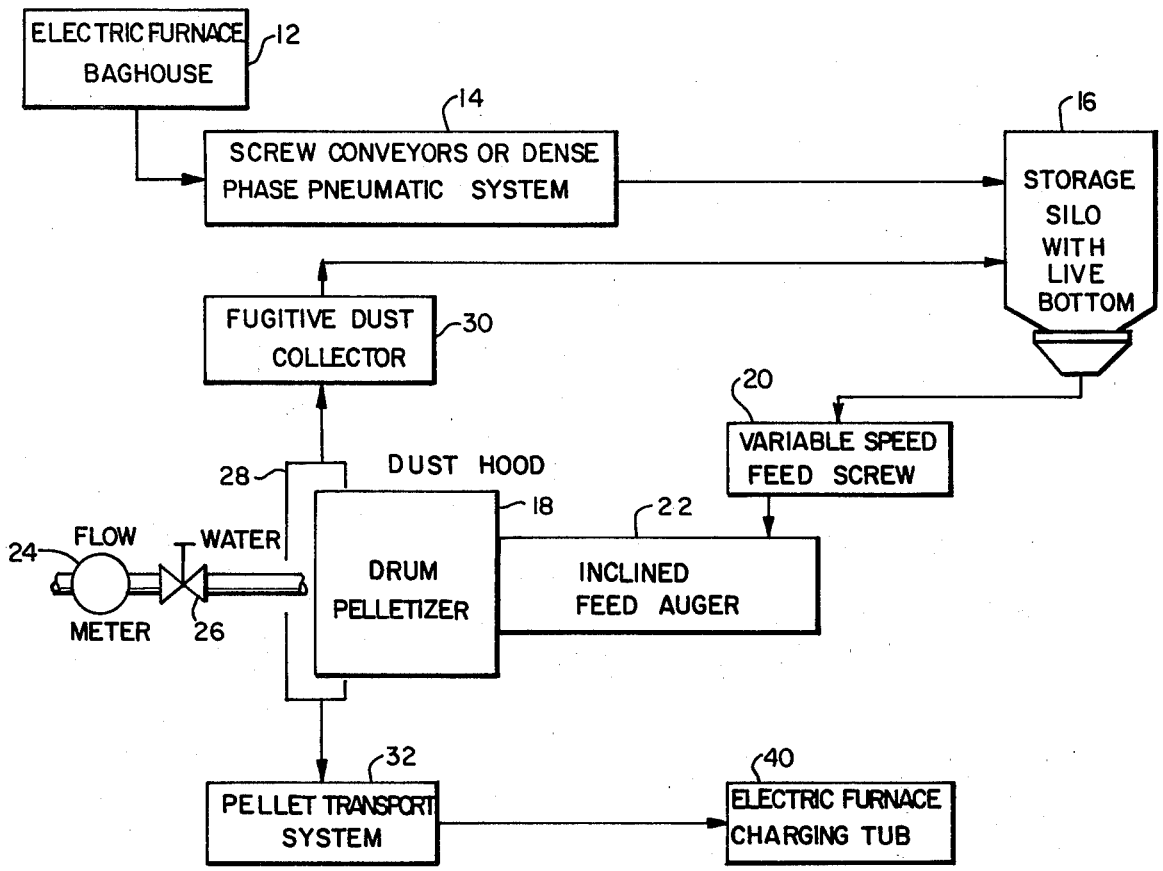
FIG. 1 is a schematic flow diagram, in block diagram form, of a collection and pelletizing system and method in accordance with the present invention.

Referring to the drawings, and particularly to FIG. 1, there is shown a flow diagram of a method of agglomerating collected iron-bearing flue dust generated in a steel making process into stable green ball pellets. Processes and methods for making such green ball pellets from the dust or fume generated in a steel making process are known in the art and are described in detail in various prior art patents and publications as discussed above.

Generally, the dust generated in a steel making process is collected in a pollution control device, such as an electrostatic precipitator or a bag house filtration system 12. The dust or fume which is recovered from the steel making operation consists of fine particles, including metallic and non-metallic compounds, such as iron oxide, zinc oxide, lead oxide, sulfur compounds, carbon, silicon dioxide, aluminum oxide, calcium oxide, magnesium oxide and the like. As discussed above, because of the presence of such particles, the dust or fume is generally considered to be a hazardous waste, the disposal of which has presented a considerable problem.

In order to place the fume or dust in a more convenient form which is more readily disposable or recycleable, the dust is balled or pelletized utilizing the method as described below. It should be understood, however, that the below-described pelletizing method is just one of many such methods which could be employed and the present invention is not intended to be limited to the pelletizing method discussed herein.

Initially, the dust from the bag house 12 is conveyed by a screw conveyor or dense phase pneumatic system 14 or a vacuum system (not shown) to a storage silo 16. A dense phase pneumatic conveyor system has been found to be a very satisfactory method of conveying the dry dust and fine particle materials, because it has been found to be less subject to failures and breakdowns. The dust is then loaded into the storage silo 16 in order to provide a constant steady source of dust for the pelletizing operation. The storage silo 16 may contain a live or vibrating bottom in order to facilitate a continuous flow of the dust material to the pelletizer and to prevent the dust from clogging or sticking to and building up on the side walls of the storage silo 16. The dust from the storage silo is fed to the bottom of a pelletizer 18 by means of a variable speed feed screw 20 and an inclined feed auger 22. Again, the purpose of the variable speed feed screw 20 and inclined feed auger 22 is to provide a continuous steady flow of the dust material into the bottom of the pelletizer 18.

In this embodiment, the pelletizer 18 is of the drum type which is well known in the art and commercially available, as from Mars Mineral Corporation of Valencia, Pa. It should be understood, however, that other types of pelletizers may be substituted for the preferred drum pelletizer without departing from the scope and concept of the present invention. For example, a disc pelletizer (not shown) may be employed.

The drum pelletizer 18 operates in the conventional manner to agglomerate the received dry dust to form stable green ball pellets. As is shown in FIG. 1, and as is also well known in the art, the agglomerating process or pelletizing preformed by the drum pelletizer utilizes the addition of water. For reasons which will hereinafter become apparent, the rate of flow of the water into the pelletizer 18 may be determined by a flow meter and may be regulated by a suitable valve 26.

It is desired that the green ball pellets leaving the drum pelletizer haver certain strength and stability characteristics in order to resist degradation during transport and handling prior to being charged into the electric arc furnace. Specifically, it is desired that the pellets have a density of between 120 and 140 pounds per cubic foot with a moisture content of between 8% to 15% by weight when they are discharged from the pelletizer. The pellets should preferably have a minimum compression strength of 8 pounds and preferably have an impact strength sufficient to survive at least 8 drops of 18 inches without deteriorating or falling apart.

The strength of the pellets is affected and to a significant extent determined by a number of factors, including the size distribution of the particles in the dust, the packing of the materials in the dust and the cohesive forces present in the dust materials. Nevertheless, as is well known in the art, it is possible to control the pellet stability and strength characteristics by controlling the pelletizing operation. Primarily, control of the pelletizing operation involves controlling the residence time that the pellets are in the pelletizer and controlling the amount of water which is added to the pelletizer for the pelletizing or agglomerating process. The amount of time that the pellets are processed in the pelletizer may be determined by a number of factors including the slope or angle of inclination of the pelletizer, the feed rate of the dust material into the pelletizer and the speed of rotation of the drum. One reason for varying the residence time of the pellets within the pelletizer 18 and the amount of water used in the agglomerating or pelletizing process is that the characteristics and composition of the dust accumulated in the bag house will vary from furnace to furnace. In addition, the characteristics and composition of the dust will vary from day to day within a specific furnace depending upon factors such as variations in the quality and make-up of the scrap material and other steel making materials being employed in the furnace, the time (after the introduction of scrap material) of collection of the dust and the meltdown rate within the furance. The controls in the pelletizing process are necessary in order to take into account the variations in the dust to provide uniformly stable pellets of a consistent strength.

It has been found that once continuous operation of the pelletizer has been established at a location, it is possible to provide a predetermined retention time within the pelletizer by presetting the drum angle, feed rate and the drum rotational speed and still provide uniformly stable and sufficiently strong pellets by varying only the flow of water to the pelletizer 18 to compensate for day to day variations in the quality and make-up of the dust. As discussed above, the flow of water may be controlled by the valve 26 to provide a moisture content in the pellets as they leave the pelletizer in the range of 8% to 15% by weight. It is understood, however, that the moisture content of the pellets may decrease due to evaporation or heating during transport and storage of the pellets after they are discharged from the pelletizer.

The pelletizer 18 may also include a dust hood 28 and a fugitive dust collector 30 for receiving and collecting any fume or dust which may escape from the pelletizer 18 during the pelletizing process. The collected fugitive dust is preferably transported back to the storage silo 16, as indicated in FIG. 1, for reprocessing through the pelletizer 18.

The stable, strong green ball pellets produced in the pelletizer 18 are transported by a conveyor or other pellet transport system 32 from the pelletizer 18 to the charging bay of an electric arc furnace (not shown) where they are placed into a charging vessel or bucket 40, as described below. The pellets are thereafter charged or loaded into the electric arc furnace in a manner which will hereinafter be described.

The method of installing or charging the green ball pellets into the electric arc furnace is particularly important and significant to achieve successful recycling of the flue dust. If the pellets are merely deposited directly into the furnace, the actions of the furnace tend to cause the pellets to break up and disintegrate, thereby turning the pellets back into fume or dust which is discharged from the furnace and cycled through the baghouse.

In order to avoid the constant recycling of the dust, the green ball pellets are placed in an electric arc furnace charging bucket at or near the bottom. Although, for purposes of the present invention, the pellets could be placed directly at the bottom of the charging bucket, the bottom of charging buckets generally do not completely close, so that, if the pellets are placed directly on the bottom of the bucket, many of the pellets would fall out of the partially opened bottom of the charging bucket before the pellets were placed in the furnace melt. As shown on FIG. 2, in order to help prevent the pellets from falling out of the partially opened bottom 42 of the charging bucket 40, a layer of lightweight steel making scrap material or shredded fragments 44 is placed at the very bottom of the charging bucket 40. A layer of the pellets 46 is then placed above the initial light scrap layer 44, the light scrap layer serving to prevent the pellets from falling through the partially opened bucket bottom 42. The lightweight scrap or shredded fragments 44 could alternatively comprise small sized pieces of medium or heavyweight steel making material, but should be of sufficient size to avoid falling out of the partially opened bottom of the charging bucket 40.

Next, a second layer of lightweight steel making scrap material 48 is placed above the pellet layer 46. If no lightweight steel making scrap material is available, small pieces of medium or heavy steel making material may be employed. Finally, a layer of medium to heavyweight steel making scrap material 50 is placed above the second light scrap layer 46 to fill the remainder of the charging bucket 40. The second layer of light scrap material 48 is necessary to prevent breakage or deterioration of the pellets in the pellet layer 46 which might otherwise occur if large sized medium to heavyweight scrap material was placed directly on top of the pellet layer 46.

Figure 2:
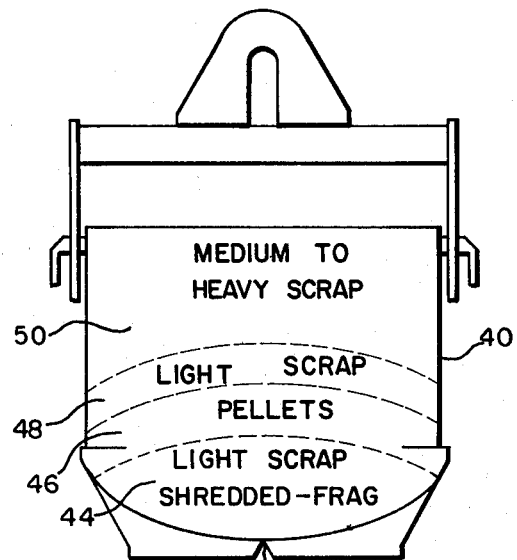
FIG. 2 is a schematic representation of a charging bucket for an electric arc furnace showing the green ball pellets therein in accordance with the method of the present invention.

Upon starting up the steel making process, it is preferred that a first charging bucket containing no green ball pellets is initially charged to the electric arc furnace. Once the electric arc furnace has been initially charged with the first charging bucket and a furnace melt is obtained, the charging bucket 40 as shown in FIG. 2, containing the green ball pellets may be used as the second or subsequent charging bucket to charge the furnace. In this manner, an initial bath of molten material is present in the bottom of the electric arc furnace when the green ball pellets are charged. Thus, when the bottom of the charging bucket 40 (containing the pellets) is opened for charging the furnace, the pellets in the pellet layer 46 are forced downwardly, by the weight of the upper layers of scrap material 48 and 50, directly into the bath of molten material in the furnace. By forcing the pellets into the molten material in this manner, the pellets are quickly submersed in the melt with little or no chance of the pellets breaking up and fuming off as dust collected in the bag house. The scrap material layers 48 and 50 above the pellets also serve as a barrier to prevent dust from the pellets, which may have disintegrated, from escaping from the molten bath of material and entering the dust removal system again.

Generally, the fume or dust generated in the steel making process of an electric arc furnace comprises about two percent by weight of the total furnace melt. The above-described method for recycling the dust for the recovery of the iron (Fe) units contained therein has been found to be successful when the quantity of pellets charged into the furnace is essentially the same as the quantity of dust or about two percent of the total furnace melt. In the recycling of flue dust into a steel bath, it is impossible to tag a specific molecule or piece of flue dust and determine exactly where it has gone. Also, the identification of small additions to large volumes is a very tedius and oftentimes impossible task. In an effort to determine what occurs when the flue dust is added to an iron base metallic melt, certain considerations and assumptions are necessary.

As a first approximation, it is assumed that a steady state condition exists in a typical electric furnace in which flue dust is being recycled. In this example, 2% of flue dust is generated and recycled in a 100 ton electric furnace. The slag generation is 10% and a typical chemical analysis of the slag and flue dust is shown in Table I.

TABLE I

TYPICAL ANALYSIS OF SLAG AND FLUE DUST

| | SLAG | FLUE DUST |
|---|---|---|
| CALCIUM OXIDE | 39.0 | 4.2 |
| MAGNESIUM OXIDE | 8.2 | 3.3 |
| SILICON OXIDE | 16.8 | 10.7 |
| ALUMINUM OXIDE | 9.4 | 5.7 |
| IRON OXIDE | 21.5 | 37.0 |
| LEAD OXIDE | 1.65 | 6.1 |
| ZINC OXIDE | .01 | 28.8 |
| | 96.56 | 95.8 |

Under the steady state conditions, on the average, the furnace would contain 100 tons of molten metel and 10 tons of molten slag. (For purpose of this analysis, it is assumed that the entire molten bath is iron containing 100% Fe). The slag is 15% Fe or 21.5% $Fe_2O_3$. Thus, there is 1.5 tons of Fe or 2.15 tons of $Fe_2O_3$ in the slag.

If the steady state condition exists without the addition of pellets and for all measurable purposes does not change with pellet addition in accordance with the above-described method, the Fe contained in the pellets is added to the molten metal resulting in a corresponding increase in the final metal yield. The addition of 2 tons of pellets at 26% Fe results in an additional 0.52% of Fe in the molten metal. If the 2% flue dust volume does not change, the Fe in the flue dust must remain in the final metal yield. The increase in metal yield is 0.52%. Thus, it appears that the greater the amount of flue dust recycled, the greater the yield of Fe in the final yield. Tests have also shown that the above described method for recycling the dust and recovery of the units is successful when the quantity of the flue dust (pellets) charged into the furnace comprises 5 to 6% by weight of the total furnace melt.

The key to the entire dust recycling and iron particle recovery process is to provide green ball pellets which are stable and strong and to charge the furnace with the pellets in a manner which immediately submerses the pellets and thereby minimizes disintegration and fume-off of the pellet material. Because of the nature of a basic oxygen furnace and the open hearth furnace and the different methods of charging, these types of furnaces are not suitable for the recycling of green ball pellets in the manner described above. Instead, the above-described method is particularly suitable for use only with an electric arc furnace.

From the foregoing description, it can be seen that the present invention provides a method for recycling of iron particles from dust generated in a steel making process which is relatively simple and inexpensive to implement. It will be recognized by those skilled in the art that changes may be made to the above described embodiment without departing from the broad inventive concepts of the invention. For example, some of the green ball pellets may be charged into the electric arc furnace in each of the second, third and subsequent charging buckets. It is understood, therefore, that this invention is not limited to the particular embodiment disclosed, but it is intended to cover all modifications which are within the scope and spirit of the invention as defined by the appended claims.

We claim:

1. A method of making a melt utilizing flue dust in a steel making process, consisting essentially of the steps of:
   collecting the dust generated in the steel making process;
   agglomerating the collected dust into green ball pellets in a pelletizing apparatus;
   loading the pellets into an electric arc furnace charging bucket by placing the pellets at or near the bottom of the charging bucket and covering the pellets with steel scrap separate from the pellets; and
   charging an electric arc furnace with the pellets and the steel scrap in the charging bucket only after the furnace has been previously charged with steel scrap without said pellets to form a melt, whereby when the pellets are charged into the melt, the pellets are immediately submersed into the melt by the steel scrap to minimize fume-off of pellet material.

2. The method of claim 1 wherein the quantity of pellets in the charging bucket comprises less than 7% by weight of the total furnace melt.

3. The method of claim 1 wherein the quantity of pellets in the charging bucket comprises about 2% by weight of the total furnace melt.

4. The method of claim 1 wherein the pellets are agglomerated and are charged into the furnace at the rate that the dust is generated on a continuing basis in the steel making process.

5. The method of claim 1 wherein the pellets are formed in the pelletizing apparatus by the addition of water in sufficient quantity to provide pellets having a moisture content of between 8 and 15% by weight.

6. The method of claim 1 wherein the pellets are formed in a pelletizing apparatus comprised of a drum type pelletizer.

7. The method of claim 1 wherein the pellets in the charging bucket are covered with a first layer of lightweight steel scrap and the layer of lightweight steel scrap is covered by a layer of medium to heavyweight steel scrap.

8. The method of claim 1 wherein the pellets in the charging bucket are covered with a layer of lightweight steel scrap.

9. The method of claims 1, 7 or 8 wherein a layer of steel scrap is placed in the bottom of the charging bucket prior to loading the pellets into the charging bucket.

* * * * *